UNITED STATES PATENT OFFICE.

CHARLES M. DUPUY, OF NEW YORK, N. Y.

IMPROVEMENT IN THE MANUFACTURE OF WROUGHT-IRON DIRECTLY FROM THE ORE.

Specification forming part of Letters Patent No. 52,149, dated January 23, 1866.

*To all whom it may concern:*

Be it known that I, CHARLES M. DUPUY, of the city, county, and State of New York, have invented a new and useful Process for Making Wrought-Iron Directly from the Ore; and I do hereby declare that the following is a full, clear, and exact description thereof.

My process is intended, chiefly, for the treatment of the rich primitive oxides and the hydrated oxides of iron, such as the Lake Champlain ores, and the rich hematites; but iron may be obtained by it from other kinds of ores, such, for instance, as rich carbonates. I prefer to use the primitive oxides, such as the Lake Champlain ores, and also to reduce the ores to small particles of about the size of peas, and to separate or wash out thoroughly all the mechanically-mixed earthy matters and impurities.

My process may be carried on in various kinds of furnaces, and the whole process may be performed in one chamber of the same furnace, or parts of it may be performed in different furnaces, or various chambers of the same furnace. I prefer to perform the whole process in a reverberatory furnace, such as those ordinarily employed in the puddling or reheating of iron in rolling-mills, but of greater capacity. After the ore has been purified and pulverized, as described, it is to be mixed with sufficient carbonaceous matter to deoxidize it, and I have found from ten to twelve per cent., by weight, of pulverized charcoal to be a good proportion for a rich primitive oxide. The mixture thus prepared is to be charged into canisters, cases, or boxes made of iron, and I have employed successfully cylindrical canisters made of thin sheet-iron—say of 23 or 24 gage—varying from four to seven inches in diameter, and from eighteen inches to two feet in length. The dimensions of the canisters and their thickness may be varied; but I have been most successful with such as are described. I prefer to supply the canisters with covers, so that the mixture is inclosed on all sides, but the process may be carried on without the covers. If the canisters are to be placed upright in the furnace I pierce the covers with small holes. If they are to be laid upon their sides I puncture small holes in that part of the canisters which is to be uppermost.

I have, in carrying out my process, at times added to the mixture of ore and carbon small quantities of flux—say one-sixteenth of one per cent. of common salt and oxide of zinc, or equal quantities of chloride of potassium or limestone in place of the salt; but the process may be performed without the use of the fluxes. I have also, at times, and with good success, mixed the ore and charcoal with water before charging into the canisters, so that the whole mass was pasty. The canisters, filled as described above, are then to be charged into a furnace and raised to a red heat, or thereabout, or a heat sufficient to deoxidize, and well known to makers of iron direct from the ore, when gases will commence to escape from the canisters and will usually burn. This heat may be kept up until the flaming ceases, when the whole, or nearly the whole, of the ore contained in the canisters will be deoxidized. The heat is then to be raised to a welding-heat, and the canisters, if still unbroken, may now be broken or battered up with a rabble, dolly, or other suitable tool, and if parts of the contents appear black they must be stirred and heated until they become bright. I prefer to break the canisters, but the process may be carried out in unbroken canisters, the mixture being left in them during the subsequent stage of the process. At this welding-heat the contents of the canisters, either broken or unbroken, will weld or partially weld to each other and to the sides of the canisters, and after the black spots become bright, or after about an hour of welding-heat, the canisters and their contents sticking together are to be withdrawn from the furnace and subjected to the action of a squeezer, hammer, puddle-ball rolls, or other proper contrivance for completely welding the particles of iron and the canisters together.

When the canisters break or are broken, they and their contents are to be balled up, so as to cause them to stick together, as before described, prior to their being withdrawn from the furnace, in a manner similar to the balling in an ordinary puddling process, and the ordinary experience of a puddler or workman accustomed to making wrought-iron direct from the ore will enable him to determine when the particles will ball, and consequently when the mass has been subjected for a sufficient time to the high heat. Experience in the process will also show that the heat may sometimes be raised before flaming ceases.

In unbroken canisters no balling is necessary, all that is needed being to batter the canisters and their contents together before taking them out of the furnace; but this way of carrying out the process is not so certain as that in which the canisters are broken and their contents examined.

I intend at times to subject the canisters to the deoxidizing heat in chambers of a furnace farther from the fire than that in which they are afterward subjected to the welding-heat, and to transfer the canisters and their contents at the proper time from the former to the latter chamber. I also intend to deoxidize in one furnace—either a reverberatory stove or other proper furnace at a proper deoxidizing heat—and then to transfer the canisters to another furnace or a forge, when they are to be subjected to the welding-heat, and I intend at times to use cast-iron canisters or boxes, but consider them as inferior to those of wrought-iron, as the former must be melted, or nearly so, during the second stage of the process, and puddled and balled up with their contents.

Sometimes I intend to subject the canisters, either broken or unbroken, and their deoxidized contents, to the Bessemer or other process for making steel, either before or after they are shingled and rolled, or both; but in all cases iron ore mingled with carbonaceous matter is to be subjected to a deoxidizing heat when contained in iron boxes or canisters, and these, either broken or unbroken, with their contents, are to form parts of the ball, billet, or mass that is withdrawn from the furnace, and is the result of the process; and this deoxidizing in iron canisters, and subsequent welding together of canisters and contents, is the distinguishing characteristic of the process.

What I claim as my invention is—

The process of obtaining wrought-iron from ores by subjecting them to heat when mixed with carbonaceous matter and charged in iron canisters, which latter are welded up and balled together with their contents, the process being conducted substantially in the manner described.

CHARLES M. DUPUY.

In presence of—
J. E. GAY,
CHARLES OSGOOD.